United States Patent
Hatton et al.

(10) Patent No.: US 9,157,651 B2
(45) Date of Patent: *Oct. 13, 2015

(54) VAPOR MITIGATION SYSTEM, VAPOR MITIGATION CONTROLLER AND METHODS OF CONTROLLING VAPORS

(71) Applicant: VAPOR DYNAMICS LLC, Blairstown, NJ (US)

(72) Inventors: Thomas E. Hatton, Blairstown, NJ (US); Michael D. Salcone, Newton, NJ (US)

(73) Assignee: Vapor Dynamics LLC, Blairstown, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 14/160,060

(22) Filed: Jan. 21, 2014

(65) Prior Publication Data
US 2014/0134938 A1 May 15, 2014

Related U.S. Application Data

(63) Continuation of application No. 13/529,864, filed on Jun. 21, 2012, now Pat. No. 8,939,825.

(60) Provisional application No. 61/502,346, filed on Jun. 29, 2011, provisional application No. 61/499,672, filed on Jun. 21, 2011.

(51) Int. Cl.
*F24F 11/04* (2006.01)
*F24F 7/06* (2006.01)
(Continued)

(52) U.S. Cl.
CPC . *F24F 11/04* (2013.01); *F24F 7/06* (2013.01); *F24F 11/0017* (2013.01);
(Continued)

(58) Field of Classification Search
CPC .............. F24F 11/0017; F24F 2011/0032; F24F 2011/003; F24F 2007/004; F24F 7/06; F24F 11/04; F24F 2007/001; Y02B 30/78; Y10S 454/909
USPC ......... 454/238, 340, 341, 344, 354, 370, 909; 406/12
See application file for complete search history.

(56) References Cited

U.S. PATENT DOCUMENTS 4,843,786 A * 7/1989 Walkinshaw et al. ........ 52/169.5
4,905,579 A * 3/1990 Dame ........................... 454/238
(Continued)

FOREIGN PATENT DOCUMENTS

EP  1653008 A1 * 3/2006 .............. E02D 31/00

OTHER PUBLICATIONS

"High Vacuum, High Airflow Blower Testing and Design for Soil Vapor Intrusion Mitigation in Commercial Buildings" by William Brodhead and Thomas E. Hatton. (Sep. 2010).
(Continued)

*Primary Examiner* — Gregory Huson
*Assistant Examiner* — Dana Tighe
(74) *Attorney, Agent, or Firm* — Proskauer Rose LLP

(57) ABSTRACT

A vapor mitigation system includes at least one vacuum pipe configured to collect vapors beneath a floor of a building, and a blower coupled to the at least one vacuum pipe. The blower is configured to create a vacuum under the floor of the building. The vapor mitigation system includes a controller configured to control a speed of the blower. The controller adjusts the speed of the blower in response to a level of vacuum created under the floor of the building.

20 Claims, 7 Drawing Sheets

(51) Int. Cl.
*F24F 11/00* (2006.01)
*F24F 7/00* (2006.01)

(52) U.S. Cl.
CPC .... *F24F 2007/001* (2013.01); *F24F 2007/004* (2013.01); *F24F 2011/003* (2013.01); *F24F 2011/0032* (2013.01); *Y02B 30/78* (2013.01); *Y10S 454/909* (2013.01)

(56) References Cited

U.S. PATENT DOCUMENTS

| | | | |
|---|---|---|---|
| 5,131,887 A | 7/1992 | Traudt | |
| 6,481,635 B2 | 11/2002 | Riley et al. | |
| 6,706,096 B2 * | 3/2004 | Sanglerat et al. | 95/274 |
| 7,347,112 B2 | 3/2008 | Kay | |
| 7,414,525 B2 * | 8/2008 | Costea et al. | 340/514 |
| 2005/0241417 A1 * | 11/2005 | Kay | 73/864.71 |
| 2010/0273121 A1 * | 10/2010 | Gleason et al. | 432/4 |

OTHER PUBLICATIONS

"Evaluating Large Buildings and Assessing the Feasibility of Applying Active Soil Depressurization as a Remedial Solution for Vapor Intrusion" by Thomas E. Hatton. (Jan. 2009).

"Designing Efficient Sub Slab Venting and Vapor Barrier Systems for Schools and Large Buildings" by Thomas E. Hatton (Oct. 2010).

"Vapor Mitigation System, Vapor Mitigation Controller and Methods of Controlling Vapors" Specification, Drawings, and Prosecution History of U.S. Appl. No. 13/529,864, filed Jun. 21, 2012, by Thomas E. Hatton, et al.

* cited by examiner

VAPOR MITIGATION SYSTEM, VAPOR MITIGATION CONTROLLER AND METHODS OF CONTROLLING VAPORS

RELATED APPLICATIONS

This application is a continuation application of U.S. patent application Ser. No. 13/529,864, filed on Jun. 21, 2012, which claims the benefit of U.S. Provisional Application No. 61/502,346, filed on Jun. 29, 2011, and U.S. Provisional Application No. 61/499,672, filed on Jun. 21, 2011, the contents of each application being incorporated herein by reference in their entirety.

TECHNICAL FIELD

The present application generally relates to vapor mitigation systems, and more particularly, to dynamically controlled vapor mitigation systems, vapor mitigation controllers and methods of controlling and mitigation vapors.

BACKGROUND

Vapor intrusion is a process by which chemicals (e.g., volatile organic compounds (VOCs), methane, radon, ect . . . ) in soil and/or groundwater mitigate to or seep into building spaces. These vapors can be released from contaminated soil and/or groundwater underneath buildings, and may enter basements, crawl spaces, rooms and/or other areas of a building or structure. As a result of vapor intrusion, the air within buildings may become contaminated thereby exposing individuals within the buildings to chemical contamination, such as VOC and/or radon contamination.

Generally, VOCs are man-made chemical compounds that have a high vapor pressure and low water solubility. VOCs can be used and produced in the manufacture of fuels, paints, pharmaceuticals, and refrigerants, and are typically included in industrial solvents, paint thinners, tetrachoroethene (dry cleaning fluid), fuel oxygenates (MTBE), and by-products produced by chlorination in water treatment. VOC contaminants can travel with or on top of groundwater, and can easily become gaseous and migrate through soil. As a result of negative pressures that are induced by various building designs and features, VOCs can be drawn from the soil and/or groundwater, and into occupied spaces of buildings where human exposure can occur.

Radon is a Class A carcinogen that, according to scientific studies, can cause harmful affects on human lung tissue. Like VOCs, radon can be drawn into buildings from the underlying soil and/or groundwater by the negative pressures that are associated with the structure and features of buildings. Negative pressure can be caused by factors such as: temperature differentials where warm air exits an upper portion of a building (induces a stack effect), and wind and exhaust appliances that create additional vacuum. These forces can draw in VOC and/or radon gases through cracks, conduit openings and other pathways in slabs, sub-slabs or other flooring features of buildings.

SUMMARY

Various systems and methods for reducing vapor contamination, such as VOCs and/or radon contamination, in buildings and structures are described herein. These system and methods may employ active soil depressurization techniques to prevent VOC's, methane and/or radon contamination within structures and buildings. In some implementations, this can be accomplished by installing a vapor mitigation system that is constructed and arranged to prevent VOC's, methane and/or radon vapor from entering interior building spaces.

For example, some systems and methods described herein are configured to maintain a pre-specified pressure differential such as two pascals (0.008" w.c.) between the interior of the building and the underlying soil, crawl space or vapor barrier. This can be accomplished by configuring a vacuum controller to monitor one or more differential pressure sensors for sensing pressure between the interior of the building and the sub slab or floor. Based on the measured pressure, the vacuum controller can control the motor speed, riser pipe (vacuum pipe) gate valve position or HVAC supply to achieve specified pressure differentials. Sensor performance ranges can be monitored and adjusted on site or remotely over the Internet (via an Internet Interface).

Some systems and methods described herein are configured to control exhaust contaminant concentrations so as to not exceed predetermined quantities as set by State or Federal statute. This can be accomplished by configuring a vacuum controller to monitor mass airflow and contaminant sensors. Mass airflow indicates volume over time and contaminate concentrations, weight per volume such as ug/m3. These sensors can provide information to the vacuum controller, which can calculate the total contaminant exhausted, for example, in pounds per hour. Typically contaminant exhaust is regulated in pounds per year.

In some embodiments, the methods and systems induce a specified number of air changes per hour in the space between the floor and the soil of a building, such as in a building with an crawl space (e.g., inaccessible crawl space). Mass airflow sensors or individual riser pipes can provide information to calculate airflow volume which when combined with the entered volume of the area being depressurized would yield an air exchange rate. The vacuum controller can be configured to control the speed of the motor and or valves in riser pipes to ensure predetermined flow volumes. In cases where there is a high rate of air transfer between the occupied space and the sub floor, such as when there are multiple conduit penetrations, the HVAC system could be integrated to pressurize the occupied space and contribute to the pressure differential and volume of exhausted air. All sensor information can be data logged, monitored and controlled either on site or over the Internet. The vacuum controller can be further configured to regulate the motor speed and or valves in individual riser pipes to control the total volume of contaminate effluent. This information can be logged and made available on site over the internet. In some embodiments, motor speeds and riser valve positions could be adjusted remotely to maximize the overall efficiency of the system to maximize both in power conservation and contaminant removal.

In one aspect, a vapor mitigation system, comprises: at least one vacuum pipe constructed and arranged to collect vapors beneath a floor of a building and to vent the vapors; a blower coupled to the at least one vacuum pipe, the blower constructed and arranged to create a vacuum under the floor of the building; and a controller configured to dynamically control a level of power supplied to the blower, wherein the controller adjusts the level of power supplied to the blower in response to one or more environmental measurements.

In some embodiments, the one or more environmental measurements are selected from the group consisting of: ambient temperature, building interior temperature, building exterior temperature, building sub-slab or floor temperature, building interior air pressure, building exterior air pressure, a level of vacuum created in the vacuum pipe, a level of vacuum created under the floor of the building, contaminant detection and blower mass air flow.

In some embodiments, the vapor mitigation system further comprises a vacuum sensor, wherein the vacuum sensor is constructed and arranged to determine a level of vacuum created under the floor of the building.

In some embodiments, the controller adjusts the level of power supplied to the blower in response to the level of vacuum.

In some embodiments, the controller increases the level of power supplied to the blower when the level of vacuum is less than a predetermined level.

In some embodiments, the controller decreases the level of power supplied to the blower when the level of vacuum is greater than a predetermined level.

In some embodiments, the predetermined level corresponds to regulatory discharge standards.

In some embodiments, the controller adjusts the level of power supplied to the blower so that the vacuum created under the floor of the building remains substantially constant.

In some embodiments, the controller is configured to adjust the level of power supplied to the blower so that the vacuum created under the floor of the building is maintained at a predetermined level.

In some embodiments, the controller is configured to adjust one or more parameters of an HVAC system.

In some embodiments, the one or more parameters are selected from the group consisting of: HVAC supply air pressure, ratio of building return air to fresh air input.

In some embodiments, the vapor mitigation system further comprises a monitoring system, wherein the monitoring system is configured to transmit a status of the vapor mitigation system to one or more host machines via the Internet.

In some embodiments, the vapor mitigation system further comprises a fresh air intake pipe constructed and arranged to allow dilution air to flow into an area beneath the floor of the building.

In some embodiments, the controller is configured to increase a level of power supplied to the blower in response to an increase in contaminant concentration beneath the floor of the building.

In some embodiments, the controller is configured to calculate a volume of dilution air drawn into the area beneath the floor of the building In some embodiments, the monitoring system is configured to receive system configuration parameters from a host machine via the Internet.

In another aspect, a method of mitigating vapors, comprises: generating an air flow within a passage so as to create a vacuum beneath a floor of a building; venting the air flow to an exterior of the building; and dynamically adjusting a level of the air flow in response to one or more environmental measurements.

In some embodiments, the one or more environmental measurements are selected from the group consisting of: ambient temperature, building interior temperature, building exterior temperature, building sub-slab or floor temperature, building interior air pressure, building exterior air pressure, barometric pressure, a level of vacuum created in the vacuum pipe, a level of vacuum created under the floor of the building, contaminant detection and blower mass air flow.

In some embodiments, the level of air flow is dynamically adjusted so that the vacuum created beneath the floor of the building remains substantially constant.

BRIEF DESCRIPTION OF THE DRAWINGS

The foregoing and other objects, features and advantages of embodiments of the present inventive concepts will be apparent from the more particular description of preferred embodiments, as illustrated in the accompanying drawings in which like reference characters refer to the same elements throughout the different views. The drawings are not necessarily to scale, emphasis instead being placed upon illustrating the principles of the preferred embodiments.

DETAILED DESCRIPTION OF EMBODIMENTS

The terminology used herein is for the purpose of describing particular embodiments and is not intended to be limiting of the inventive concepts. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

It will be understood that, although the terms first, second, third etc. may be used herein to describe various limitations, elements, components, regions, layers and/or sections, these limitations, elements, components, regions, layers and/or sections should not be limited by these terms. These terms are only used to distinguish one limitation, element, component, region, layer or section from another limitation, element, component, region, layer or section. Thus, a first limitation, element, component, region, layer or section discussed below could be termed a second limitation, element, component, region, layer or section without departing from the teachings of the present application.

It will be further understood that when an element is referred to as being "on" or "connected" or "coupled" to another element, it can be directly on or above, or connected or coupled to, the other element or intervening elements can be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.). When an element is referred to herein as being "over" another element, it can be over or under the other element, and either directly coupled to the other element, or intervening elements may be present, or the elements may be spaced apart by a void or gap.

Figure 1:
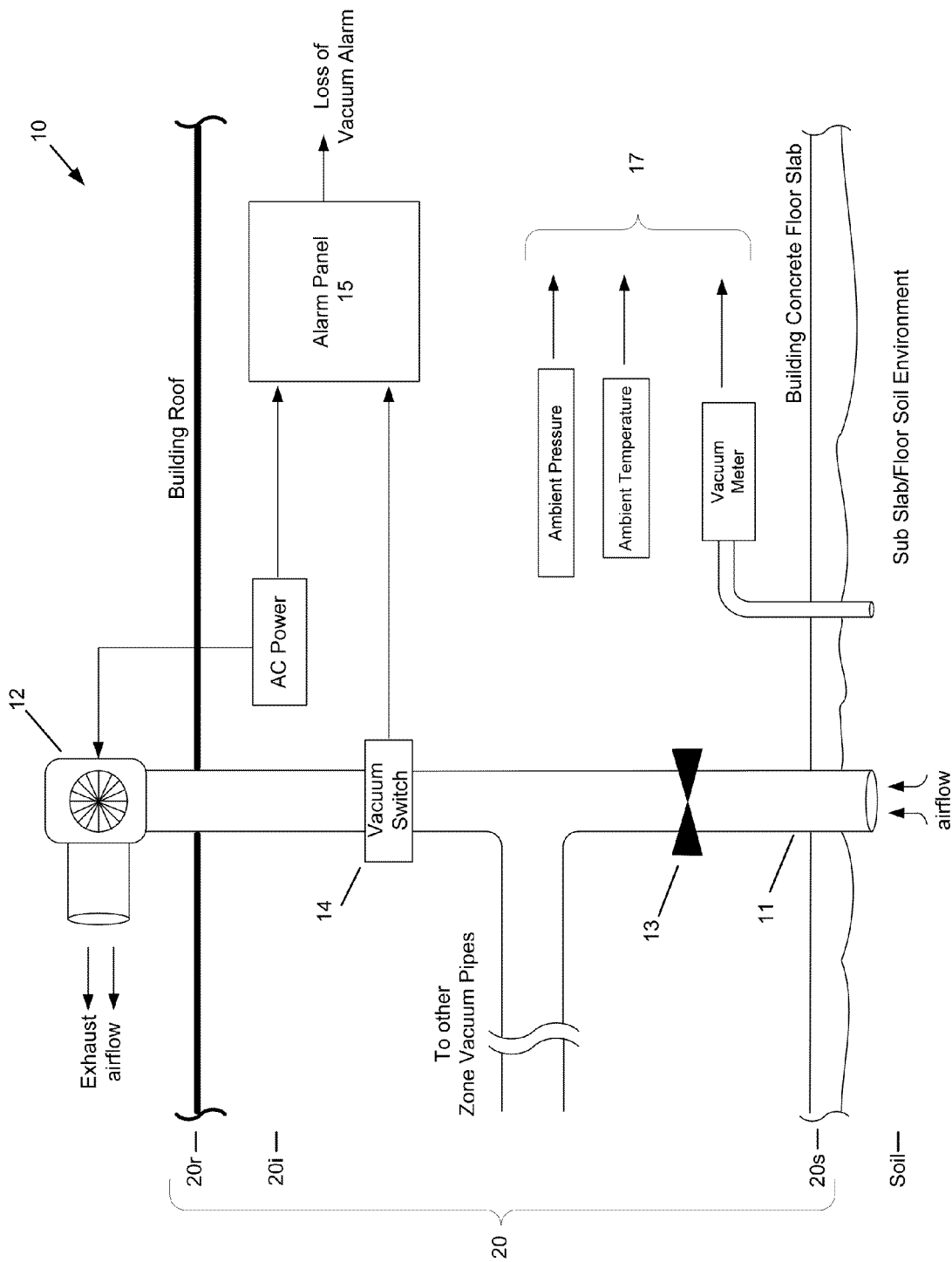
FIG. 1 is a block diagram of a vapor mitigation system.

FIG. 1 is a block diagram of a vapor mitigation system. A vapor mitigation system 10 can be installed and/or provided in a building or structure 20, and may comprise one or more vacuum pipes 11 and a constant power/speed blower 12. In this exemplary embodiment, the vapor mitigation system 10 is arranged to create a vacuum under the floor or building slab 20s (or vapor barrier) of the building 20 so as to collect VOC and/or radon vapors. The vapor mitigation system 10 is further arranged to vent an exhaust airflow of VOC's, methane and/or radon vapors above the building roof 20r.

In the vapor mitigation system 10 shown in FIG. 1, one or more vacuum pipes 11 are arranged to collect vapors beneath the floor or building slab 20s of the building 20. A first opening of the vacuum pipe 11 is positioned beneath the floor or building slab 20s and a second opening of the vacuum pipe 11 is coupled to a constant power/speed blower 12 so as to create a vacuum (negative pressure) under the floor or building slab 20s of the building 20.

The vapor mitigation system 10 is configured based on collected measurements 17 (e.g., ambient pressure and temperature of the building interior 20i, vacuum pipe pressure (vacuum level) and building slab vacuum pressures) at various levels of applied vacuum. That is, an installer makes a series of manual adjustments (i.e., air flow restriction) to the system 10 in response to collected measurements. For example, in response to an initial collection of measurements, the level of applied vacuum pressure by the system 10 can be manually adjusted by opening or closing a gate valve 13, which is shown coupled between the first and second ends of the vacuum pipe 11. However, the restriction of air flow created by the closing of the gate valve 13 introduces energy inefficiencies into the system 10, since the blower 12 is operated at a constant speed/power. Accordingly, more power may be consumed by the constant power/speed blower 12 than is required to achieve the desired vacuum level.

Further, the vapor mitigation system 10 is configured to apply an overwhelming vacuum pressure underneath the floor or building slab 20s of the building 20 so as to compensate for various changes in building and environmental conditions. For example, pressures within the building interior 20i change due to wind loading and stack effect of appliances, such as HVAC systems. Accordingly, the vapor mitigation system 10 is configured to apply an overwhelming vacuum underneath the floor or building slab 20s of the building 20 so that a minimum vacuum level is applied irrespective of changing building or environmental conditions.

Furthermore, changing environmental conditions, such as sub-slab moisture content and/or barometric fluctuations, can result in an excessive amount of vacuum being applied by the system 10. This can likewise introduce energy inefficiencies, and may require further design and calibration of the system 10 (which can introduce other economic inefficiencies).

The vapor mitigation system 10 may further comprise an alarm panel 15 and a vacuum switch 14, which is configured to detect the presence of an applied vacuum. In response to the binary detection of an applied vacuum, the alarm panel 15 can issue an on-site alarm if the vacuum pressure falls below a predetermined level.

Figure 2:
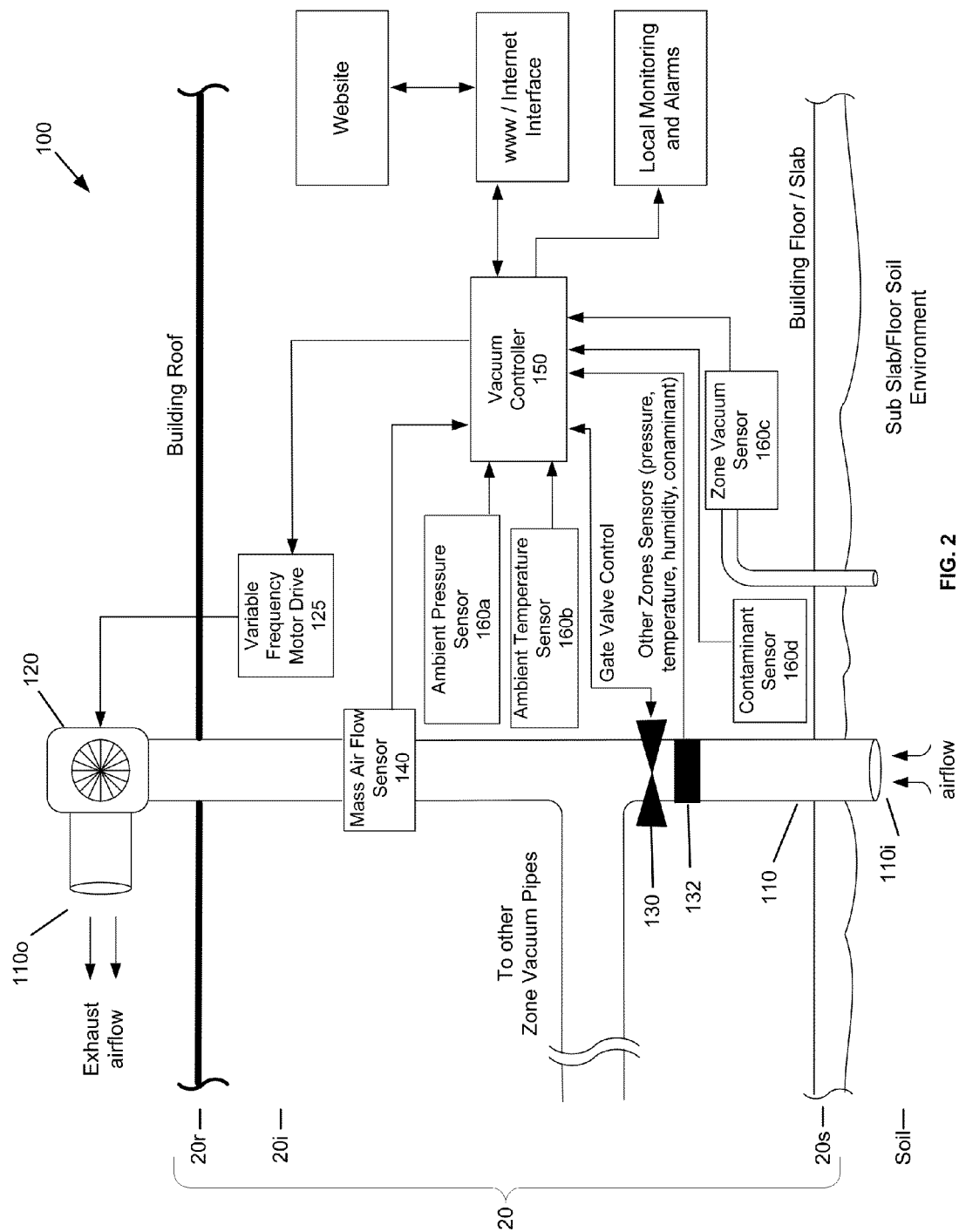
FIG. 2 is a block diagram of a dynamically controlled vapor mitigation system in accordance with embodiments of the present inventive concepts.

FIG. 2 is a block diagram of a dynamically controlled vapor mitigation system in accordance with embodiments of the present inventive concepts. A dynamically controlled vapor mitigation system 100 can be installed and/or provided in a building or structure 20, and may comprise one or more riser pipes or vacuum pipes 110, a vacuum controller 150 and a variable power/speed blower 120. The vapor mitigation system 100 may further include any of the above features or elements of the vapor mitigation system 10 described above with reference to FIG. 1.

The vapor mitigation system 100 is constructed and arranged to create a vacuum under a floor or building slab or vapor barrier 20s of a building 20 so as to collect VOCs, methane and/or radon vapors, and may be further be arranged to vent an exhaust airflow of VOCs, methane and/or radon vapors above the building roof 20r. In the dynamically controlled vapor mitigation system 100 shown in FIG. 2, one or more vacuum pipes 110 are arranged to collect vapors beneath the floor or building slab 20s of the building 20. In some embodiments, a first opening of the vacuum pipe 110 is be positioned beneath the floor or building slab 20s and a second opening of the vacuum pipe 110 is coupled to a variable power/speed blower 120 so as to create a vacuum under the floor or building slab 20a of the building 20. Although not shown, a plurality of vacuum pipes 110 may be positioned to create the vacuum under the floor or building slab 20s of the building 20. For example, a plurality of vacuum pipes 110 and/or a single vacuum piper having a plurality of vacuum pipe inlets 110i may be positioned to create vacuum zones (a first vacuum zone is shown in FIG. 2). In this manner, the dynamically controlled vapor mitigation system 100 can be arranged and/or configured to vent an exhaust airflow of VOC, methane and/or radon vapors above the building roof 20r.

The vacuum controller 150 of the system 100 can include a microprocessor or other type of processing system that configured to control and/or adjust the level of vacuum applied under the floor or building slab 20s of the building 20 in response to building and/or environmental measurements. These measurements may include, for example, ambient and/or interior temperatures (ambient temperature sensor 160a), building interior air pressure (ambient temperature sensor 160b), building exterior air pressure, such as barometric pressure (ambient temperature sensor 160b), building sub-slab or vapor pressure, or floor air pressure (zone vacuum sensor 160c), contaminant detection (contaminant sensor 160d), vacuum pipe pressure (vacuum/pressure sensor 132) and/or blower mass air flow (mass air flow sensor 140).

In some embodiments, the system 100 may be configured to reduce the speed of the blower 120 in response to a blower mass air flow measurement. For example, the blower mass air flow measurement may indicate a large volume of air that may exceed the blower's 120 motor factor. In response to the blower mass air flow measurement, the vacuum controller 150 may decrease the power/speed of the blower 120 so as not to exceed the blower's 120 motor factor. In addition, the blower mass air flow measurement may indicate a volume of contaminate removed from the sub slab or floor environment, which can trigger the vacuum controller 150 to increase or decrease the applied vacuum.

The vacuum controller 150 may be configured to vary the power applied to the blower 120 (so as to adjust the blower fan speed and applied vacuum) and/or to adjust the opening or closing of an electronically controlled gate valve 130 (optional) in response to the building and/or environmental measurements. For example, the vacuum controller 150 may be configured to regulate the air flow within the one or more vacuum pipes 110 (e.g., which can be sensed by the mass air flow sensor 140) so that various sub slab vacuum fields can be balanced and/or to apportion sub slab vacuum pressure to specific areas that have higher contaminant concentrations or Lower Explosive Limit (LEL), oxygen content or other contaminant extraction goals. A plurality of electronically controlled gate valves 130 may be provided so as to control applied vacuum pressures in embodiments having multiple air flow inlets 110$i$.

The vacuum controller 150 may be configured to vary the power applied to the blower 120 and/or to adjust the opening or closing of an electronically controlled gate valve 130 (optional) to control an amount of contaminants discharged into the atmosphere. For example, some States have permitable discharge standards that relate to annual gross pounds of contaminant discharged to the atmosphere. By measuring and collecting the contaminate concentrations and the discharge velocity of contaminants, the vacuum controller 150 may be configured to calculate a total contaminate discharge. Based on the total contaminate discharge, the vacuum controller 150 can reduce the power/speed of the blower 120 so that the amount of contaminant discharged into the atmosphere is reduced. In this manner, the system can be configured to reduce contaminant discharged so as not to exceed regulatory discharge standards.

The vacuum controller 150 can determine and control an optimum vacuum level to be applied under the floor or building slab 20$s$. Accordingly, energy efficiencies can be increased by monitoring the building and/or environmental measurements, and reducing the power/speed of the blower 120 when the vacuum applied under the floor or building slab 20$s$ exceeds operating requirements. In addition, the controller 150 can increase the power/speed of the blower 120 if a high level of contaminants are detected within the building interior 20$i$.

The building and/or environmental measurements can be acquired via one or more sensors 140, 160$a$-$d$ electronically coupled to the controller 120. For example, the sensors 140, 160$a$-$d$ may be electrically coupled to the controller 120 via wires or cables (e.g., direct or indirect wired connections, network connections, ect . . . ), or, additionally or alternatively, the sensors 140, 160$a$-$c$ may be wirelessly coupled to the controller 120.

In some embodiments, the dynamically controlled vapor mitigation system 100 may include one or more of the following sensors: a mass air flow sensor 140, an ambient pressure sensor(s) 160$a$ (interior and/or exterior building pressure sensors), an ambient temperature sensor(s) 160$b$ (interior and/or exterior building pressure sensors), an inline zone vacuum sensor 160$c$ and a contaminant sensor 160$d$. The mass air flow sensor 140 may be coupled to the one or more vacuum pipes 110, between an airflow inlet 110$i$ and an airflow outlet 110$o$. The ambient temperature sensor(s) 160$b$ and ambient pressure sensor(s) 160$a$ may be provide within the building interior 20$i$, exterior to the building, and or beneath the building floor or slab 20$s$. The data from the pressure sensors 160$a$ processed by the vacuum controller 150 to determine interior/exterior/sub floor differential pressures. The contaminant sensor 160$d$ may be provided within the interior of the building so that a level of chemical contamination can be monitored; however, alternatively or additionally, the contaminant sensor 160$d$ may be coupled to or provided within the vacuum pipes or beneath the floor slab 110 so that contaminant content drawn from specific vacuum zones can be measured.

During operation of the system 100, the vacuum controller 150 may be configured to provide a blower motor power/speed command to a variable frequency motor drive controller 125. In response to the blower motor power/speed command, the variable frequency motor drive controller 125 adjusts a power output supplied to the blower 120, which in turn affects the speed of the blower 120 and the level of applied vacuum. In addition, the vacuum controller 150 may provide a gate valve command to the electronically controlled gate valve 130 (if used). In this manner, the vacuum controller 150 can be configured to maintain a predetermined and/or constant sub floor vacuum level when other conditions, such as environmental and/or building conditions, change. For example, changes in soil moisture, stack effect, wind loading and seasonal atmospheric conditions my affect the floor vacuum level or contaminant concentrations. Accordingly, the system 100 can be more economical to operate since only the required level of vacuum is created.

Figure 3:
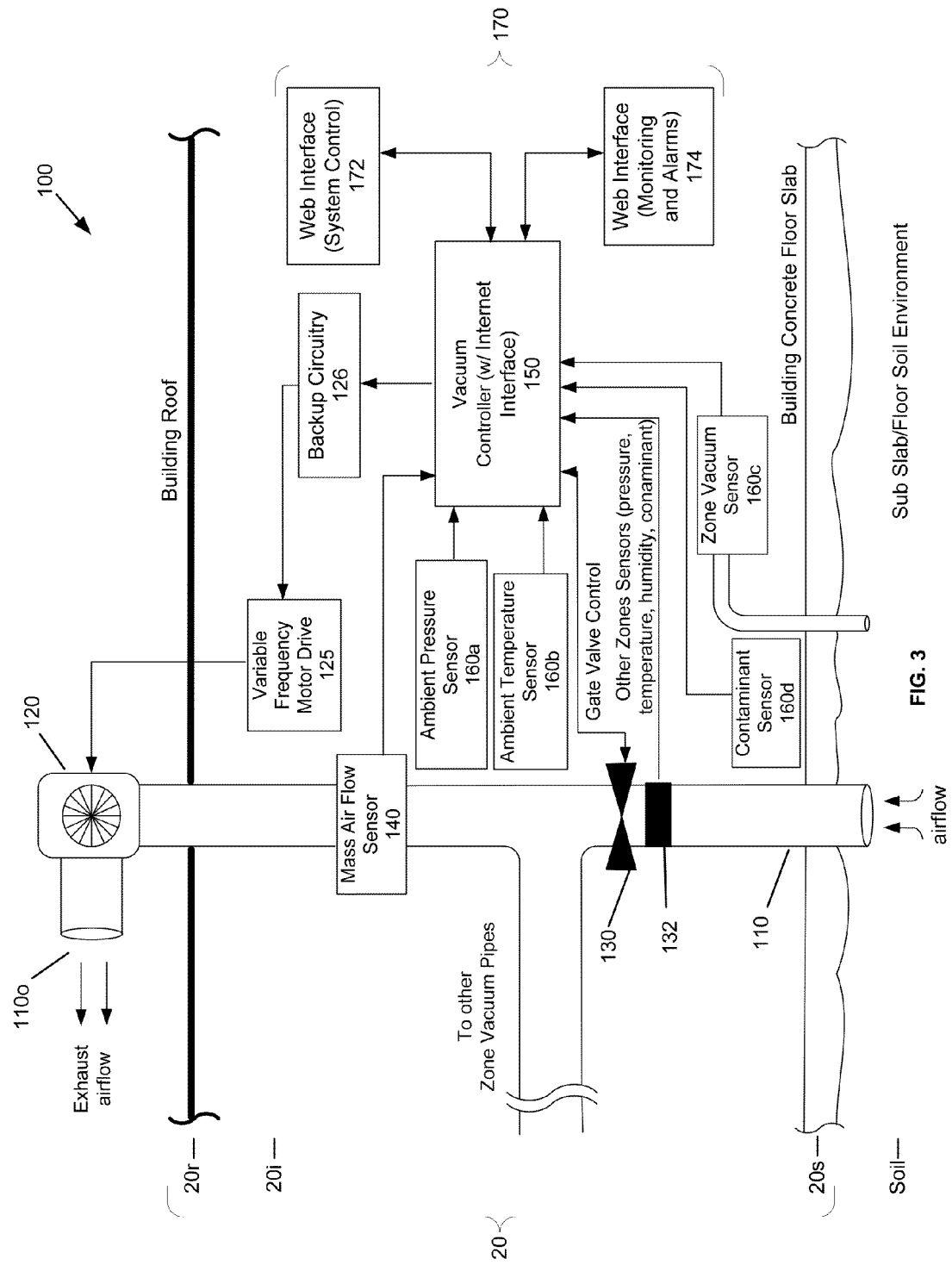
FIG. 3 is a block diagram of another dynamically controlled vapor mitigation system in accordance with other embodiments of the present inventive concepts.

Referring to FIGS. 2 and 3, the dynamically controlled vapor mitigation system 100 may further include a monitoring system 170, which can generate, transmit and/or provide system alerts and faults. Additionally or alternatively, the monitoring system 170 can provide onsite and/or offsite network access to the system 100 so that workers and/or other system maintenance professionals can inspect and/or adjust operating parameters of the system 100. For example, the monitoring system 170 can include a first and second web interfaces 172, 174 that can be accessed via a local area network and/or the Internet. The first web interface 172 provides access to system control parameters, and the second web interface 174 provides access to system monitoring and alarm indicators and signals.

The monitoring system 170 can also be configured to collect data, such as system status data and/or environmental data so that system maintenance can be scheduled before a complete failure of the system occurs, thus reducing maintenance costs and minimizing building occupant contaminant exposure. This data, along with system alerts and/or faults, can be sent via the Internet to a host system that can collect the data and issue alarms or status updates electronically. Additionally or alternatively, the monitoring system 170 of the vacuum controller 150 can transmit alerts via common data services, such as email or text messaging. Accordingly, unattended buildings can be monitored at a low cost, since onsite checkups may be reduced and/or eliminated.

The system 100 may further comprise backup settings or backup setting circuitry 126 that configure the operation of the blower 120 in that case of a vacuum controller fault. For example, if the vacuum controller 150 is unable to determine an optimum vacuum level or the backup setting circuitry identifies a fault with the vacuum controller 150, the backup setting circuitry 126 can configure the blower 120 to operate in a predetermined state. The predetermined state may correspond to a vapor mitigation system configuration based on collected measurements (e.g., such as the system configuration described with reference to FIG. 1).

Figure 4:
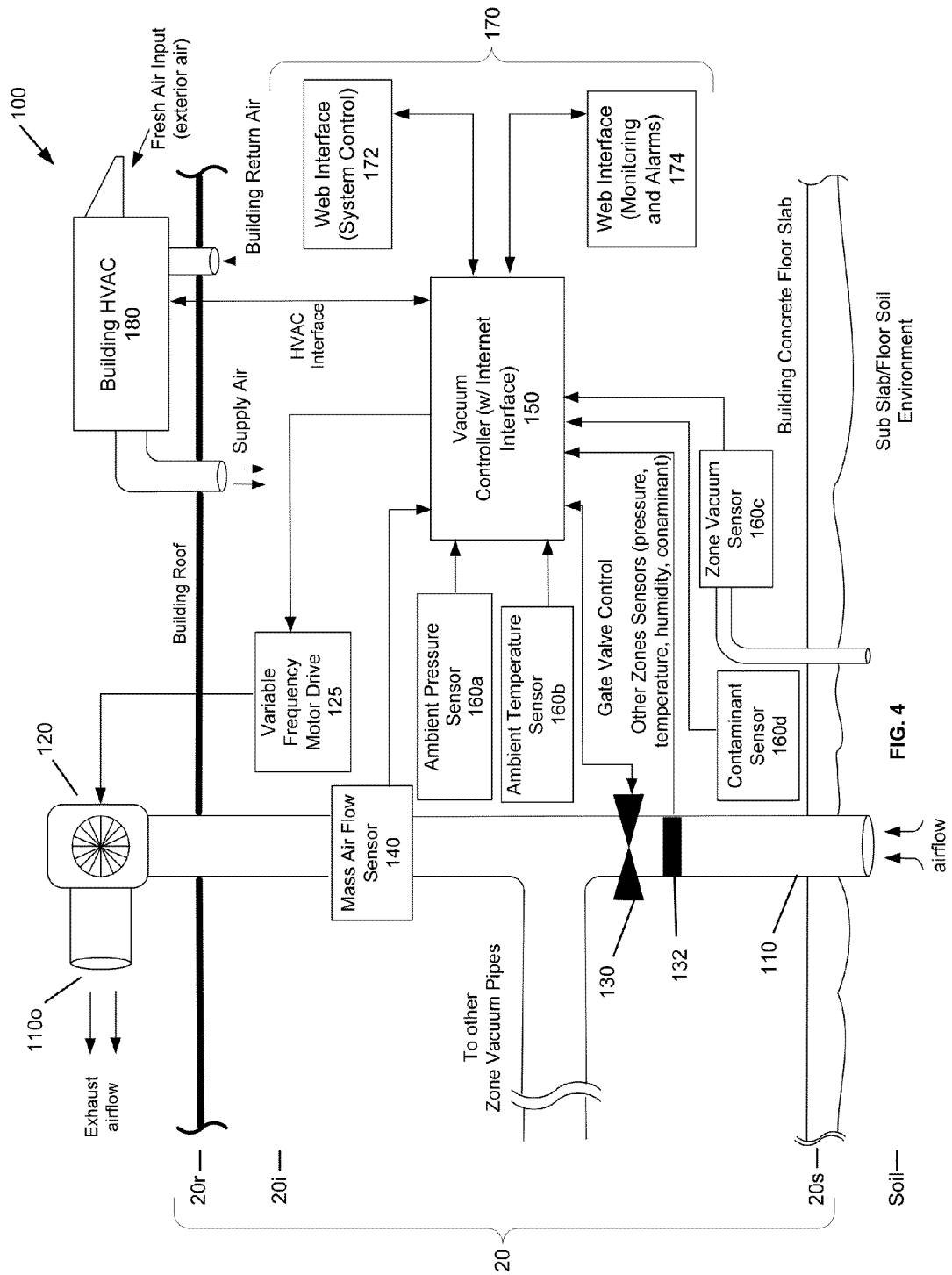
FIG. 4 is a block diagram of another dynamically controlled vapor mitigation system in accordance with other embodiments of the present inventive concepts.

FIG. 4 is a block diagram of another dynamically controlled vapor mitigation system. Further to the dynamically controlled vapor mitigation systems 100 shown in FIGS. 2 and 3, the vacuum controller 150 may be further configured to control the floor or slab 20$s$ vacuum pressure by interfacing with the building HVAC system 180. In some implementations, the controller 150 may be configured to control various parameters of the building HVAC system 180. For example, the controller 150 my command the building HVAC system 180 to introduce a greater amount of fresh air into the interior of the building 20$i$ so as to reduce contaminant concentrations detected by the contaminant sensor 160$d$.

In some embodiments, the vacuum controller 150 may be configured to control one or more parameters of the building HVAC system 180 so as to adjust an interior building pressure and/or the amount of fresh air supplied to the building interior 20$i$. For example, the convective forces of the HVAC system 180 may create negative pressures within the building interior 20$i$, which can draw VOC's, methane and/or radon vapors into the building interior 20*i*. In response to the convective forces, the vacuum controller 150 may be configured to counterbalance the affects of the convective forces by mechanically pressurizing the building interior 20*i* with excess exterior air (e.g., fresh air input). Furthermore, the exterior air drawn into the building interior 20*i* through the HVAC system 180 generally has a lower concentration of contaminants. Accordingly, the vacuum control 150 may be configured to dilute the air within the building interior 20*i* to further lower indoor contaminate concentrations.

The vapor mitigation system 100 may further include any of the above features or elements of the vapor mitigation systems 10, 100 described above.

Figure 5:
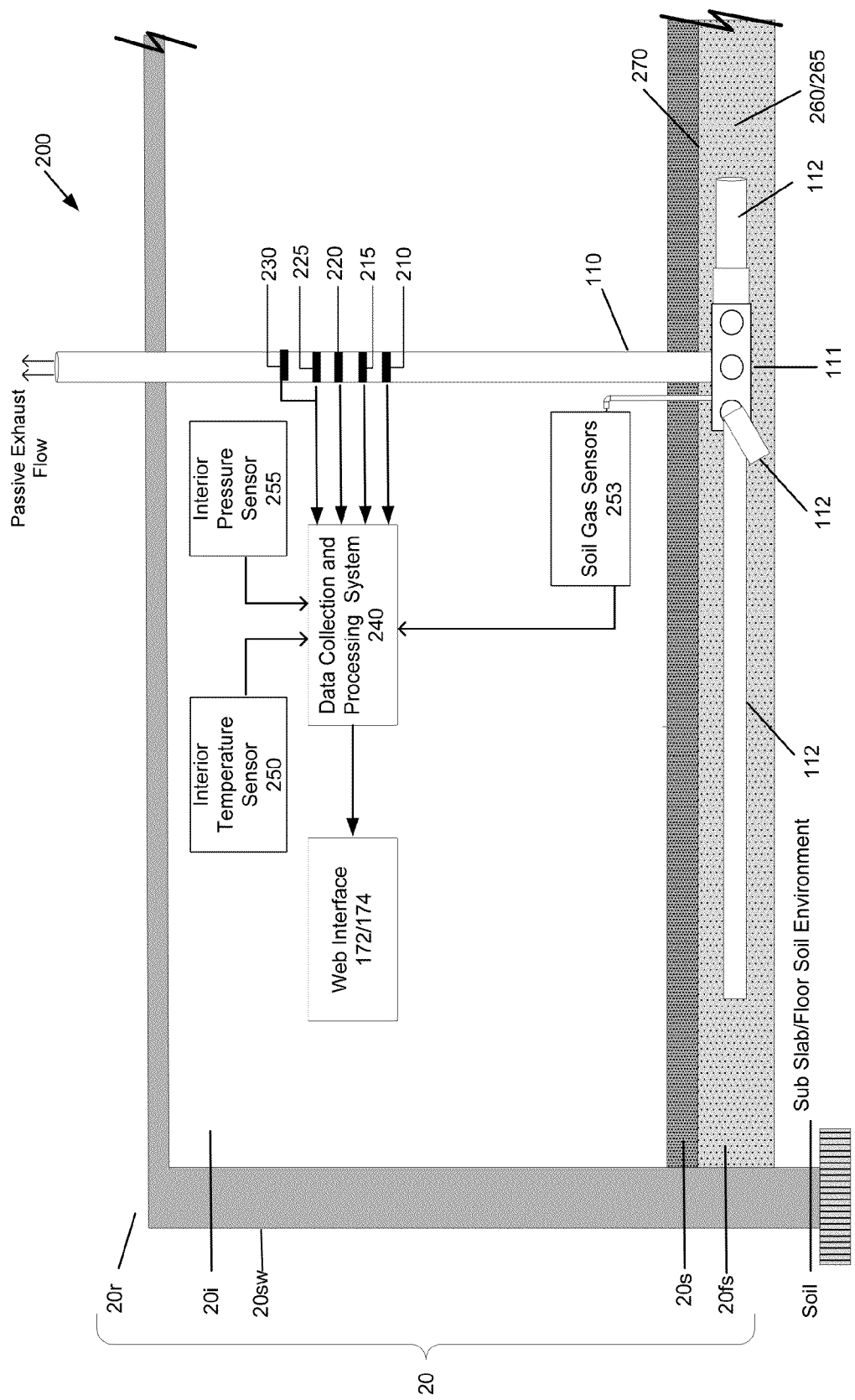
FIG. 5 is a block diagram of a passive vapor mitigation system in accordance with other embodiments of the present inventive concepts.

FIG. 5 is a block diagram of a passive vapor mitigation system. A vapor mitigation system 200 can be installed as part of a new construction building 20, or installed as part of an existing building 20. The vapor mitigation system 200 includes one or more vacuum pipes 110 for collecting and venting soil vapors (VOC vapors, radon vapors and/or other vapors). For example, in the present exemplary embodiment, a collection box 111 having a network of gas conveyance pipes 112 is shown coupled to the vacuum pipe 110. The network of gas conveyance pipes 112 collects soil vapors from beneath the building floor or slab 20*s*, and funnels the soil vapors to the collection box 111 where the soil vapors are vented to an exterior of the building by the vacuum pipe 110. The vapor mitigation system 200 is constructed and arranged to create natural convection under the floor, vapor barrier or slab 20*s* of the building 20 so as to collect and vent the soil vapors without the use of a transport device, such as a blower or fan.

The vapor mitigation system 200 can be configured to monitor the performance of new construction passive systems or existing construction passive systems, which rely on convective airflow that is induced by weather and building features. The operation of these systems 200 is dependent upon the construction features and weather. Construction features of the building can include such features as: angularity height, HVAC system. These features can affect the convective flow of air and induce pressure differentials between the interior of the building and the underlying soil or sub floor. The weather, interior/exterior pressure differentials such as forces applied on a building by wind, and changes in the barometer can cause fresh dilution air to move down the riser pipe or vacuum pipe 110 and into the sub slab soil environment as well as create convective venting of the sub slab. Monitoring the condition of the systems 200 enables consultants to measure the passive effectiveness of the systems 200 as well as develop a data base to support continued passive venting or provide cause to change the system to active by installing a blower.

The vapor mitigation system 200 includes a floor system 20*fs* for collecting the gaseous vapors from beneath the building floor or slab 20*s*. In one embodiment, the floor system 20*fs* includes a bed of crushed stone 190 that surrounds the network of conveyance pipes 112 and/or the collection box 111. The floor system 20*fs* can also include a crawl space and/or a vapor barrier 195 to prevent the soil vapors from entering the building interior 20*i*. In another embodiment, the bed of crushed stone 190 is replaced with an aerated floor system 195, such as Cupolex®. The aerated floor system 195 can include a grid of interconnected plastic arch forms that are applied over the soil prior to the pouring of concrete, which creates hollow spaces beneath the slab 20*s* after the concrete is poured and cured. The network of conveyance pipes 112 collect the soil vapors beneath the building floor or slab 20*s* so that the soil vapors can be passively vented to an exterior of the building 20.

In situations where it is unclear what design (crushed stone or aerated floor system) is the most efficient and effective solution from an environmental abatement, energy efficiency and financial effectiveness point of view, a data collection system 240 and a series of monitoring sensors 210, 215, 220, 225, 230, 250, 253, 255 can be installed. By comparing data from systems 200 that utilize a bed of crushed stone 190 and systems 200 that utilize an aerated floor system 195, building engineers and consultants can determine which design (crushed stone or aerated floor system) is the most efficient and effective solution.

The data collection system 240 is connected to a plurality of monitoring sensors, and is configured to collect data during operation of the system 200. For example, the data collection system 240 can be connected to a mass airflow sensor 210 for determining a mass flow rate and direction of air exiting/entering the vacuum pipe 110, an air humidity sensor 215 for determining the humidity of air exiting/entering the vacuum pipe 110, an air temperature sensor 220 for determining the temperature of air exiting/entering the vacuum pipe 110, inline pressure differential sensors for determining directional convective flow pressure 225, and a contaminate sensor 230 for determining a type and concentration of contaminant within the air exiting/entering the vacuum pipe 110. The data collection system 240 can also be connected to an interior temperature sensor 250 for sensing the ambient temperature within the building interior 20*i*, and an interior pressure sensor 255 for sensing the pressure within the building interior 20*i*. The data collection system 240 can be connected to soil gas sensors 253 for sensing VOC's, methane gas and/or radon gas.

The data collected and recorded by the data collection system 240 can be accessed by building engineers and consultants via a web interface 172/174 for determining various operating conditions of the vapor mitigation system 200 over a period. For example, directional air flow data collected from the mass airflow sensor 210 can indicate whether the system 200 is venting soil gases or recharging the soil (sub slab) with outside air.

Changes in barometric pressure, temperature, airflow around a building and convective variation are all variables that contribute to the effectiveness of passive venting. By monitoring contaminant concentrations and other system parameters, designers, building engineers and consultants can quantify the effectiveness of these systems and determine which designs are best suited for the contaminate soil conditions and features of a particular building or structure. The data collection and processing system 240 allows the designers, building engineers and consultants with data that can be used to evaluate the effectiveness of various passive soil gas vent designs.

Figure 6:
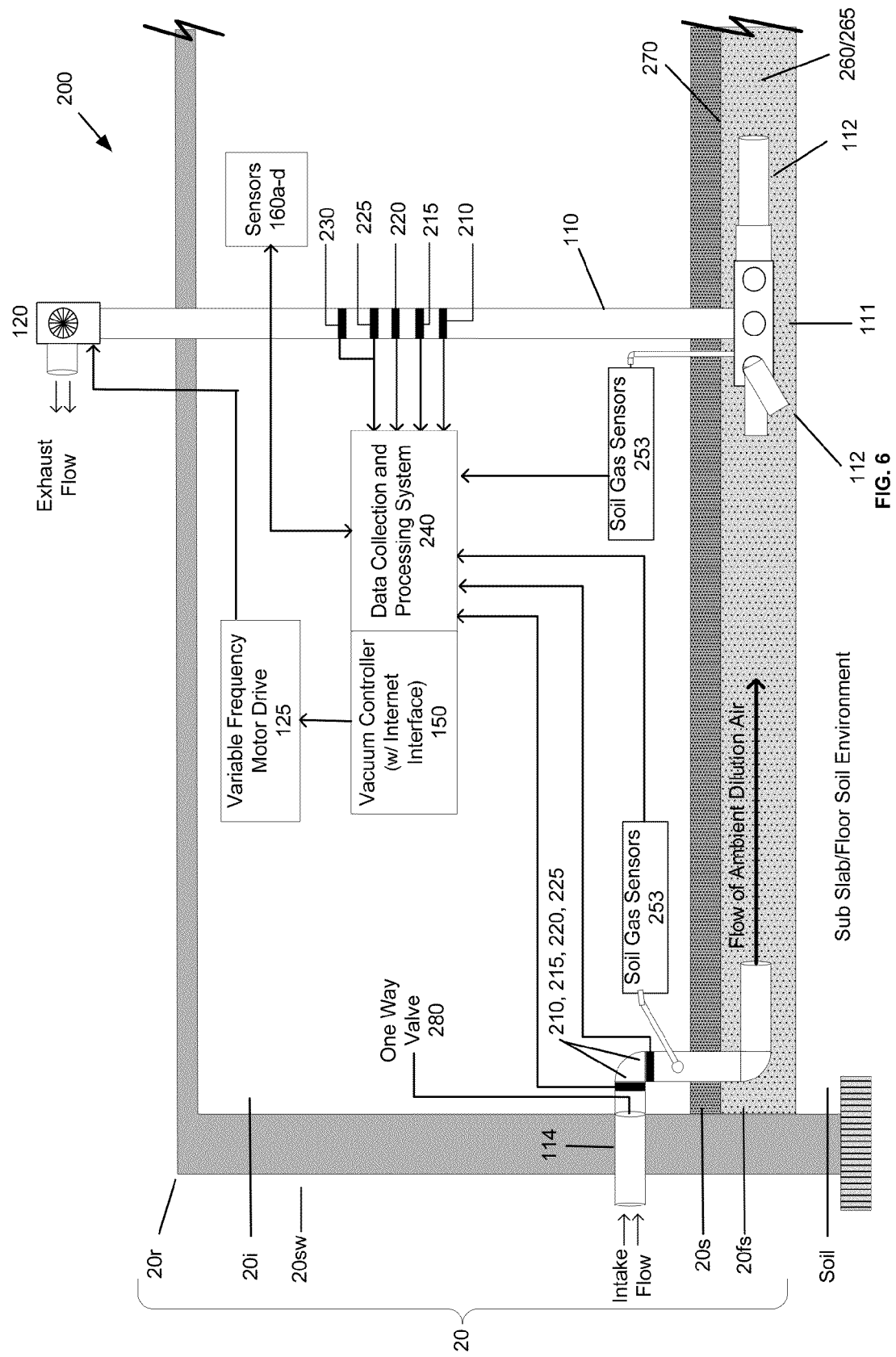
FIG. 6 is a block diagram of a dynamically controlled active vapor mitigation system in accordance with embodiments of the present inventive concepts.

FIG. 6 is a block diagram of a dynamically controlled vapor mitigation system. A vapor mitigation system 200 can be installed as part of a new construction building 20, or installed as part of an existing building 20. In some embodiments, the vapor mitigation system 200 can have sufficient passive convection (natural convention) to effectively vent the sub slab. However, in other embodiments, changing environmental factors can prevent the vapor mitigation system 200 from venting the sub slab in a passive mode alone. To properly vent the sub slab, the vapor mitigation system 200 can be further configured with active venting elements. For example, the vapor mitigation system 200 can include a blower 120, a variable frequency motor drive 125 and a vacuum controller 150. The vacuum controller 150 can be configured to operate the blower 120 in response to data received from the data collection and processing system 240 and the sensors 210, 215, 220, 225, 230, 253 coupled to the vacuum pipe 110 and/or the fresh air intake. For example, if directional air flow data collected from the mass airflow sensor 210 or the pressure differential sensor 225 indicates that the system 200 is recharging the sub slab with outside air, the vacuum controller 240 can activate the blower 120 (thereby applying a vacuum pressure to the sub slab) to return the system 200 to a venting state. While the vacuum controller 150 and data collection and processing system 240 are shown as separate blocks, these elements can be implemented by the same processor or controller element. The vapor mitigation system 200 can include any of the above features or elements of the active vapor mitigation systems 100 shown and described in connected with FIGS. 1-4.

In some passive and active embodiments, the system 200 includes a fresh air intake that can be positioned, for example, in the side wall 20$sw$ of the building 20. The fresh air intake 114 includes piping, and is constructed and arranged such that an inlet of the fresh air intake piping is positioned at an exterior of the building and an outlet of the fresh air intake piping is positioned beneath the building floor or slab 20$s$. The fresh air intake 114 provides for the conveyance of outside dilution air to the sub slab or floor soil environment of the building 20. The fresh air intake 114 can be provided in systems 200, for example, when it is beneficial to mix fresh air with the soil gases that are seeping out from the vadose zone of the soil environment beneath the building 20 for the purpose of lowering the potential for combustion or explosion of the soil gases. The ambient dilution air provided by the fresh air intake 114 can also be used to lower volumetric contaminant concentrations beneath the building floor or slab 20$s$. In some embodiments, the vacuum pipes 110 are located in the center of the building 20 or on a sidewall that is opposite the inlet of the fresh air intake 114 so as to attain maximum dilution benefit from the introduction of fresh air.

The vacuum controller 150 of the system 100 is configured to control and/or adjust the level of vacuum applied under the floor or building slab 20$s$ of the building 20 in response to building and/or environmental measurements. These measurements can include, for example, ambient temperatures, interior vacuum pipe temperatures, building interior air pressure, building exterior air pressure, building sub slab or floor air pressure, contaminant detection, blower mass air flow, direction of airflow and/or in riser vacuum measurements. In some embodiments, the system 200 can be configured to operate in a passive mode (blower off) when there is sufficient passive convection (natural convention) to effectively vent the sub slab, and can be configured to operate in the active mode (blower on) when there is insufficient passive convection.

As described above in connection with the active vapor mitigation systems of FIGS. 2-4, the vacuum controller 150 may be configured to vary the power applied to the blower 120 (so as to adjust the blower fan speed and applied vacuum) and/or to adjust the opening or closing of an electronically controlled gate valve 130 (not shown) in response to the building and/or environmental measurements.

For example, when the sub slab soil gas sensor 253 nearest the vacuum pipe 110 or near the fresh air intake measure contaminant concentrations that exceed predetermined sub slab concentrations, the data collection system 240 and/or the vacuum controller can activate the blower 120 or increase the speed of the blower 120 to exhaust the contaminants and lower the contaminant concentration. In some embodiments, the sub slab vacuum induced by the blower 120 opens a one way valve 280 of the fresh air intake 114, which permits fresh air to be drawn through the sub slab. The data collection system 240 can collect and record data from sensors 210, 215, 220, 225, 230 of the fresh air intake 114, such as barometric pressure, mass airflow, vacuum pipe pressure differentials, air temperature, air humidity and contaminant concentration. Contaminant concentrations near the fresh air intake may reduce quickly in response to the vacuum induced by the blower 120, while contaminant concentrations near the vacuum pipe 110 inlet may reduce at a slower rate. When contaminant sensors determine that contaminant concentrations near the vacuum pipe 110 inlet and/or in the vacuum pipe 100 itself are reduced to a predetermined level, such as Lower Explosive Limit (LEL), the motor speed of the blower 120 is reduced or the blower 120 is turned off by the system 200 for the purpose of conserving energy.

In this manner, the vacuum controller 150 can determine and control the on/off position or create an optimum vacuum level to be applied under the floor or building slab 20$s$. Accordingly, energy inefficiencies can be reduced by monitoring the building and/or environmental measurements, and reducing the power/speed of the blower 120 when the vacuum applied under the floor or building slab 20$s$ exceeds operating requirements. In addition, the controller 150 can increase the power/speed of the blower 120 if a higher level of contaminants are detected within the building interior 20$i$.

The methods and processes disclosed herein can be implemented by the above systems and devices, or equivalent systems and devices, executing a unique set of instructions stored or embodied in computer accessible media. As will be appreciated by those skilled in the art, a unique set of instructions can be implemented or embodied as executable code, such as, software, firmware, machine code or a combination thereof. As such, the unique set of instructions stored or embodied in computer accessible media transforms the above systems and devices into particular, special purpose systems and devices that can operate, for example, according to the following exemplary flow diagrams. In some embodiments, unique sets of instructions correspond to the methods and processes disclosed FIG. 7 and described below in further detail.

Figure 7:
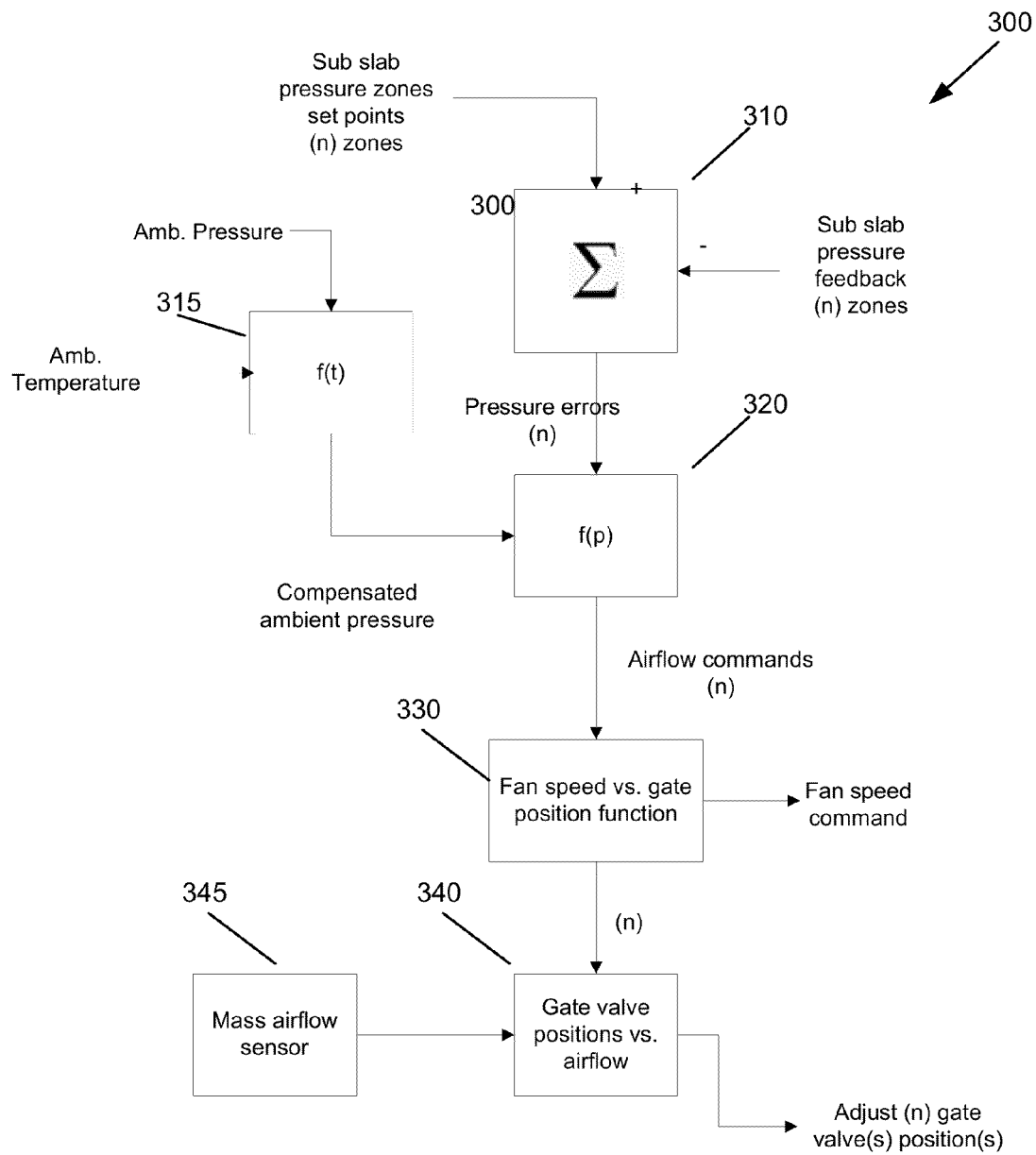
FIG. 7 is a flow diagram illustrating a method of controlling a vapor mitigation system in accordance with embodiments of the present inventive concepts.

FIG. 7 is a flow diagram illustrating a method of controlling a vapor mitigation system. The flow diagram illustrates a method 300 of controlling a vapor mitigation system 100, 200. At step 310 the controller (vacuum controller or processing system) compares preset pressure zone set points to measurements captured by the sub slab pressure sensors in each of the zones being controlled. The outputs at step 310 are the pressure zone error signals. At step 320 the zone pressure error signals are modified by the compensated ambient pressure level, which is a composite signal of the ambient pressure and ambient temperature which is generated at step 315. The outputs of step 320 are the airflow commands. At step 330 the magnitude of the airflow commands are used to generate gate valve position commands and the fan speed command signals. The fan speed signals are used to control the variable speed motor drive that controls the fan speed as shown in FIGS. 2-4 and 6. At step 340, the gate valve position commands are modified based on the output of the mass airflow sensor 345. The gate valves are positioned accordingly to the commands generated from step 340.

While the present inventive concepts have been particularly shown and described above with reference to exemplary embodiments thereof, it will be understood by those of ordinary skill in the art, that various changes in form and detail can be made without departing from the spirit and scope of the present inventive concepts described and defined by the following claims.

What is claimed is:

1. A vapor mitigation system comprising:
at least one vacuum pipe configured to collect vapors from a sub slab environment beneath a building and to vent the vapors;
a contaminate sensor configured to determine a concentration of a contaminant within the vapors collected within the at least one vacuum pipe;
a blower coupled to the at least one vacuum pipe, the blower configured to create a vacuum in the sub slab environment relative to ambient pressure within the building;
a fresh air inlet pipe that provides outside air to the sub slab environment;
a valve that dynamically limits a flow of outside air to the sub slab environment through the fresh air inlet pipe; and
a controller in communication with the blower, the contaminant sensor, and the valve, the controller being configured to dynamically control the valve to limit the flow of outside dilution air to the sub slab environment based on the concentration of the contaminant in the vacuum pipe, wherein the dynamic control of the valve comprises, responsive to the contaminant sensor determining that the concentration of the contaminant within the vacuum pipe exceeds a predetermined threshold level, providing a signal to temporarily open the valve to permit the flow of outside dilution air to the sub slab environment.

2. The vapor mitigation system of claim 1 further comprising a vacuum sensor configured to determine the level of vacuum created in the sub slab environment.

3. The vapor mitigation system of claim 2, wherein the controller decreases the speed of the blower when the level of vacuum is greater than a predetermined level.

4. The vapor mitigation system of claim 1, wherein the controller is further configured to dynamically control a level of power supplied to the blower, wherein the controller adjusts the level of power supplied to the blower in response to one or more environmental measurements.

5. The vapor mitigation system of claim 4, wherein the controller adjusts the speed of the blower so that the level of vacuum created in the sub slab environment remains substantially constant.

6. The vapor mitigation system of claim 1, wherein the controller is configured to adjust the speed of the blower so that the level of vacuum created in the sub slab environment is maintained at a predetermined level.

7. The vapor mitigation system of claim 1, wherein the controller is configured to transmit a status of the vapor mitigation system to, and/or to receive system configuration parameters from, one or more host machines via the Internet.

8. The vapor mitigation system of claim 1, wherein the valve comprises a one way valve.

9. The vapor mitigation system of claim 1 further comprising a monitoring system configured to provide access to operating parameters of the vapor mitigation system.

10. The vapor mitigation system of claim 9, wherein the monitoring system includes a web interface for adjusting the operating parameters of the vapor mitigation system.

11. The vapor mitigation system of claim 9, wherein the monitoring system is configured to collect system status data.

12. The vapor mitigation system of claim 11, wherein the monitoring system is configured to transmit the system status data to a host machine via the Internet.

13. The vapor mitigation system of claim 1, further comprising a sub slab soil gas sensor configured to determine a concentration of the contaminant within the sub slab environment.

14. The vapor mitigation system of claim 13, wherein the controller is configured to dynamically control the valve to limit the flow of outside dilution air to the sub slab environment based on the concentration of the contaminant in the sub slab environment.

15. The vapor mitigation system of claim 1 wherein at least one of the at least one vacuum pipes is located in a central region of the building and the fresh air inlet pipe enters the building through a side wall of the building.

16. A vapor mitigation system comprising:
a blower coupled to at least one vacuum pipe, the blower configured to extract vapor from a sub slab environment beneath a building and to vent the vapors through the at least one vacuum pipe;
a mass air flow sensor coupled to the at least one vacuum pipe, the mass air flow sensor configured to measure a level of mass flowrate of vapor extracted from the sub slab environment;
a contaminant sensor coupled to the at least one vacuum pipe, the contaminant sensor configured to measure a level of contaminant in the vapor extracted from the sub slab environment;
a valve that dynamically limits a flow of outside air to the sub slab environment through the fresh air inlet pipe; and
a controller in communication with the blower, the mass air flow sensor, the contaminant sensor, and the valve, the controller being configured to: i) calculate an amount of contaminant extracted from the sub slab environment; and ii) dynamically control the valve to limit the flow of outside dilution air to the sub slab environment based on the concentration of the contaminant in the vapor extracted from the sub slab environment, wherein the dynamic control of the valve comprises, responsive to the contaminant sensor determining that the concentration of the contaminant the vapor extracted from the sub slab environment exceeds a predetermined threshold level, providing a signal to temporarily open the valve to permit the flow of outside dilution air to the sub slab environment.

17. The vapor mitigation system of claim 16, wherein the controller is further configured to adjust the speed of the blower in response to the concentration of the contaminant extracted from the sub slab environment.

18. The vapor mitigation system of claim 16, wherein the controller is further configured to adjust the speed of the blower so that the amount of contaminant exhausted away from the building does not exceed a predetermined amount of contaminant.

19. The vapor mitigation system of claim 16, wherein the valve is a one way valve.

20. A vapor mitigation system, comprising:
a blower coupled to at least one vacuum pipe, the blower configured to extract vapor from a sub slab environment beneath a building;
a mass air flow sensor coupled to the at least one vacuum pipe, the mass air flow sensor configured to measure a mass flowrate of vapor extracted from the sub slab environment;
a contaminant sensor coupled to the at least one vacuum pipe, the contaminant sensor configured to measure a level of contaminant in the vapor extracted from the sub slab environment;

a fresh air inlet pipe that provides outside air to the sub slab environment a valve that dynamically limits a flow of outside air to the sub slab environment through the fresh air inlet pipe; and a controller in communication with the blower, the mass air flow sensor, the contaminant sensor, and the valve, the controller being configured to: i) adjust a speed of the blower so that the mass flowrate of vapor extracted from the sub slab environment remains substantially constant; and ii) dynamically control the valve to limit the flow of outside dilution air to the sub slab environment based on the concentration of the contaminant in the vapor extracted from the sub slab environment, wherein the dynamic control of the valve comprises, responsive to the contaminant sensor determining that the concentration of the contaminant the vapor extracted from the sub slab environment exceeds a predetermined threshold level, providing a signal to temporarily open the valve to permit the flow of outside dilution air to the sub slab environment.

* * * * *

UNITED STATES PATENT AND TRADEMARK OFFICE
CERTIFICATE OF CORRECTION

| | | |
|---|---|---|
| PATENT NO. | : 9,157,651 B2 | Page 1 of 1 |
| APPLICATION NO. | : 14/160060 | |
| DATED | : October 13, 2015 | |
| INVENTOR(S) | : Hatton et al. | |

It is certified that error appears in the above-identified patent and that said Letters Patent is hereby corrected as shown below:

In the Claims:

At lines 10-15 of Claim 16 (lines 24-29 of column 14 of the printed patent), delete:

"a contaminant sensor coupled to the at least one vacuum pipe, the contaminant sensor configured to measure a level of contaminant in the vapor extracted from the sub slab environment;
a valve that dynamically limits a flow of outside air to the sub slab environment through the fresh air inlet pipe; and"

and replace it with:

--a contaminant sensor coupled to the at least one vacuum pipe, the contaminant sensor configured to measure a level of contaminant in the vapor extracted from the sub slab environment;
a fresh air inlet pipe that provides outside air to the sub slab environment;
a valve that dynamically limits a flow of outside air to the sub slab environment through the fresh air inlet pipe; and--

Signed and Sealed this
Twenty-third Day of August, 2016

Michelle K. Lee
*Director of the United States Patent and Trademark Office*